United States Patent
Bai et al.

(10) Patent No.: US 10,242,375 B2
(45) Date of Patent: Mar. 26, 2019

(54) METHODS AND APPARATUS FOR CONNECTED VEHICLES APPLICATION EFFECTIVENESS ESTIMATION

(71) Applicant: Honda Motor Co., Ltd., Tokyo (JP)

(72) Inventors: Xue Bai, Novi, MI (US); Samer Rajab, Southfield, MI (US)

(73) Assignee: Honda Motor Co., Ltd., Tokyo (JP)

( * ) Notice: Subject to any disclaimer, the term of this patent is extended or adjusted under 35 U.S.C. 154(b) by 428 days.

(21) Appl. No.: 15/197,613

(22) Filed: Jun. 29, 2016

(65) Prior Publication Data

US 2018/0005254 A1    Jan. 4, 2018

(51) Int. Cl.
| | | |
|---|---|---|
| H04L 29/08 | (2006.01) | |
| H04L 29/06 | (2006.01) | |
| B60R 16/023 | (2006.01) | |
| G06Q 30/02 | (2012.01) | |
| B60W 10/00 | (2006.01) | |
| H04L 12/24 | (2006.01) | |

(52) U.S. Cl.
CPC ......... *G06Q 30/0203* (2013.01); *B60W 10/00* (2013.01); *H04L 41/00* (2013.01); *H04L 67/12* (2013.01); *H04L 67/34* (2013.01)

(58) Field of Classification Search
CPC ........ H04L 67/12; H04L 67/34; B60W 40/09; B60W 10/00; G08G 1/166; G08G 1/163; G08G 1/096791; G08G 1/164; G06Q 30/0203; G07C 5/008; G07C 5/085; G07C 5/08; H04W 84/005
See application file for complete search history.

(56) References Cited

U.S. PATENT DOCUMENTS

| | | | |
|---|---|---|---|
| 8,626,774 B2 | 1/2014 | Avadhanam et al. | |
| 9,098,367 B2 | 8/2015 | Ricci | |
| 9,129,532 B2* | 9/2015 | Rubin | G08G 1/166 |
| 9,300,423 B2* | 3/2016 | Rubin | H04J 3/1694 |
| 9,393,958 B2* | 7/2016 | Stahlin | G06K 9/6289 |
| 9,813,542 B1* | 11/2017 | Shan | H04M 1/72533 |
| 9,870,001 B1* | 1/2018 | Mangal | B60W 50/08 |
| 10,070,338 B2* | 9/2018 | Boban | H04W 28/08 |
| 2011/0140968 A1* | 6/2011 | Bai | G01S 5/0072 342/454 |
| 2015/0261754 A1 | 9/2015 | Bai et al. | |
| 2015/0262198 A1 | 9/2015 | Bai et al. | |

(Continued)

OTHER PUBLICATIONS

Timpner et al., Secure smartphone-based registration and key deployment for vehicle-to-cloud communications, 6 pages (Year: 2013).*

(Continued)

*Primary Examiner* — Thuy Dao
(74) *Attorney, Agent, or Firm* — Rankin, Hill & Clark LLP

(57) ABSTRACT

Some embodiments are directed to a processor based computer system for enabling an implementer to select software for deployment to a vehicle control system. The system can include a processor based computer system that is configured to perform a first identifying step that includes identifying available V2X applications for the system, a second evaluation step that includes evaluating parameters for the V2X applications identified in the first identifying step, and a third ranking step that includes raising or lowering the ranking of each V2X application based on the second evaluation step.

20 Claims, 8 Drawing Sheets

(56) References Cited

U.S. PATENT DOCUMENTS

2016/0381059 A1* 12/2016 Galula ................. H04L 63/123
726/23
2018/0176209 A1* 6/2018 Narayanan .......... H04L 63/0823

OTHER PUBLICATIONS

Ding et al., Understanding and modelling information dissemination patterns in vehicle-to-vehicle networks, 10 pages (Year: 2015).*
The CAMP Vehicle Safety Communications Consortium consisting of BMW, DaimlerChrysler, Ford, GM, Nissan, Toyota, and VW; 'Vehicle Safety Communications Project Task 3 Final Report—Identify Intelligent Vehicle Safety Applications Enabled by DSRC'; Mar. 2005; National Technical Information Service, Springfield, Virginia 22161.

* cited by examiner

METHODS AND APPARATUS FOR CONNECTED VEHICLES APPLICATION EFFECTIVENESS ESTIMATION

BACKGROUND

The disclosed subject matter relates to methods and apparatus for connected vehicles application effectiveness estimation. In particular, the disclosed subject matter relates to selecting applications for vehicle computer systems, including but not limited to a connected vehicle operating system, software applications, etc. In particular, the disclosed subject matter relates to analyzing and ranking software applications for a vehicle controller system, such as with regard to connected vehicle technology.

Traditional vehicles that travel along land routes (such as on highways, roads, streets, paths, etc.) or along other routes of travel (such as in the air, water, space, etc.) can include instruments and controls that are relevant to affecting aspects of the vehicle's operation (such as speed, route of travel, mileage, fuel supply, etc.) as well as instruments and controls irrelevant to the vehicle's operation (such as audio, video, navigation systems, communication systems, etc.). These instruments and controls can be implemented via processor based electronic systems, and new types of user interface options have enabled vehicle occupants to access these electronic systems. In fact, some vehicles consolidate some or all electronics, instruments and controls that affect or otherwise relate to vehicle information, navigation, and audio/visual systems into an in-vehicle computer, such as an onboard computer system, which can be accessed or otherwise operated by vehicle occupants via a user interface. Some of these on-board computer systems operate in accordance with an operating system, software applications, user interfaces, etc. that can be installed, loaded, etc. by the manufacturer, dealer, end user, etc.

SUMMARY

Various conditions may be relevant to a vehicle's travel along a path or route. For example, in the context of vehicles that travel over land, such as an automobile configured for travel along a road, a vast array of circumstances may arise that can affect or otherwise be relevant to the vehicle's travel. An entity, such as another vehicle, pedestrian, bicyclist, etc., may move to a location immediately in the path of the vehicle on the road, causing the vehicle to contact the entity unless the vehicle stops, changes course, etc. As another example, other types of circumstances may arise making it preferable to change the vehicle's path or route of travel, such as to enable the vehicle to arrive at a certain destination more safely, quickly, efficiently, etc. Changing traffic patterns or severe weather may make a vehicle's current path of travel more congested, and thus a different path may be preferable.

Vehicles may be provided with methods and apparatus for addressing the above conditions. For example, sensors can be mounted on vehicles to detect entities currently disposed in the vehicle's immediate path of travel for the purpose of warning the vehicle's operator to take action to avoid crashing into the entity. Vehicle operators may also utilize global positioning systems (GPSs) to determine currently effective routes of travel, and even modify these routes based on changing traffic conditions. In other words, current conditions can be monitored for the purpose of benefitting vehicle operators.

The processor based electronics, including the in-vehicle control systems disclosed above, may require one or more software applications to augment the capability of the basic operating platform. Certain applications can be useful to implement connected vehicle (V2X or Vehicle-to-Everything) technology. V2X is an emerging technology that can be beneficial to enhance users' roadway safety. The technology, generally referred to as V2X communications, can include communications among vehicles and to or from other entities on or nearby the roadway. V2X can have various applications beneficial to enhancing roadway safety, mobility, and a positive environmental impact. Some applications for Vehicle to Vehicle (V2V) and Vehicle to Infrastructure (V2I) technology have been identified by governmental regulating authorities as software and systems that can enhance roadway safety. Certain V2X applications for a vehicle control system are intended to make V2X communications beneficial for users.

For example, V2V, V2M (Vehicle to Motorcycle), and V2P (Vehicle to Pedestrian) technologies can advantageously provide a warning to a driver of a potential collision with other V2X-enabled entities, such as a remote vehicle (car, truck, motorcycle) or a pedestrian. V2X applications can also beneficially warn a driver of certain roadway scenarios that can include but are not limited to a remote vehicle in a same lane performing a hard brake, a remote vehicle swerving or losing control in the same vicinity as the host vehicle, a remote vehicle merging into the same lane as the host vehicle, tailgating, etc. In another example, V2I technology can beneficially warn a driver of a red light violation, over-speeding in a curve, an upcoming work zone or lane closure, severe weather conditions, etc.

V2X software applications that can be installed in an on-board V2X controller are available for implementers to select from for deployment. However, most of the current software applications for V2X that are intended to make V2X communications beneficial for users have not yet reached a certain level of market penetration, and therefore have not achieved a satisfactory effectiveness level.

Thus, it may be beneficial to address at least one of the issues identified above. For example, it may be beneficial to facilitate selection of a V2X application for deployment to a vehicle controller system. It may also be beneficial to reduce difficulty in the selection process by evaluating effectiveness of an application prior to installation. It may particularly be beneficial to provide an implementer of the V2X application an objective analysis of a group of heterogeneous V2X applications by ranking the applications based on a combined group of factors.

In addition, the above and/or other processes and configurations can be implemented via a menu driven user interface in all of the contexts disclosed above including for each type of application. However, embodiments are intended to include or otherwise cover any other beneficial type of user interface for implementing the above applications, operations, configurations, etc.

Some embodiments are therefore directed to a processor based computer system for enabling an implementer to select software for deployment to a vehicle control system. The system can include a processor that is configured to perform a first identifying step that includes identifying available V2X applications for the system, a second evaluation step that includes evaluating parameters for the V2X applications identified in the first identifying step, and a third ranking step that includes raising or lowering the ranking of each V2X application based on the second evaluation step. The processor based control system can be configured so that the second evaluation step includes, for each of the V2X applications, the steps of analyzing a market penetration rate influence on parameters affect the V2X application performance, analyzing the V2X application's applicability to current technology and technological standards, analyzing a frequency at which a roadway scenario occurs that could be addressed by the V2X application, analyzing one or more benefits to a host vehicle hosting the control system resulting from a successful execution of the V2X application, and analyzing application performance sensitivity under a low market penetration influence.

Some other embodiments are directed to a system for enabling an implementer to select software for deployment in a vehicle control system. The system can include a processor based computer system that is configured to perform a first identifying step that includes identifying available V2X applications for the vehicle control system, a second evaluation step that includes evaluating parameters for the V2X applications identified in the first identifying step, and a third ranking step that includes raising or lowering the ranking of each V2X application based on the second evaluation step. The system can also include a vehicle control system that is configured for operation with a host vehicle, wherein certain of the ranked V2X applications can be executed by a processor in the vehicle control system. The processor based control system is configured so that the second evaluation step includes, for each of the V2X applications, the steps of analyzing a market penetration rate influence on parameters affect the V2X application performance, analyzing the V2X application's applicability to current technology and technological standards, analyzing a frequency at which a roadway scenario occurs that could be addressed by the V2X application, analyzing one or more benefits to a host vehicle hosting the control system resulting from a successful execution of the V2X application, and analyzing application performance sensitivity under a low market penetration influence.

Still other embodiments are directed to a method of configuring a processor based computer system for enabling an implementer to select software for deployment in a vehicle control system, the processor based computer system, comprising:

configuring the processor based computer system via a user interface so as to perform a first identifying step that includes identifying available V2X applications for the system, a second evaluation step that includes evaluating parameters for the V2X applications identified in the first identifying step, and a third ranking step that includes raising or lowering the ranking of each V2X application based on the second evaluation step. The second evaluation step can include, for each of the V2X applications, the steps of analyzing a market penetration rate influence on parameters affect the V2X application performance, analyzing the V2X application's applicability to current technology and technological standards, analyzing a frequency at which a roadway scenario occurs that could be addressed by the V2X application, analyzing one or more benefits to a host vehicle hosting the control system resulting from a successful execution of the V2X application, and analyzing application performance sensitivity under a low market penetration influence.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Network Environment for a Vehicle

Some of the disclosed embodiments relate to vehicles configured with technology for a computer system to analyze, display, and/or control information including but not limited to vehicle data and statistics, navigation and traffic data, collision warning data, network communication information, and multi-media management and playout, etc. In the disclosed embodiments, vehicles configured with in-vehicle computer and display technology can include automobiles, trucks, vans, minivans, sport utility vehicles (SUVs), busses, recreational vehicles, amusement park vehicles, trams, golf carts, robotically controlled vehicles, automated drive vehicles, remote controlled vehicles, drones, motorcycles, scooters, mopeds, ATVs, trains, trams, light rail trains, boats, ships, or other watercraft, aircraft, helicopters, or any transport related entity. In fact, the various disclosed methods and apparatus are intended to be usable with any type of mode of transport that can travel along, or can be located in proximity to, any improved, unimproved, and/or unmarked route or path.

Figure 1:
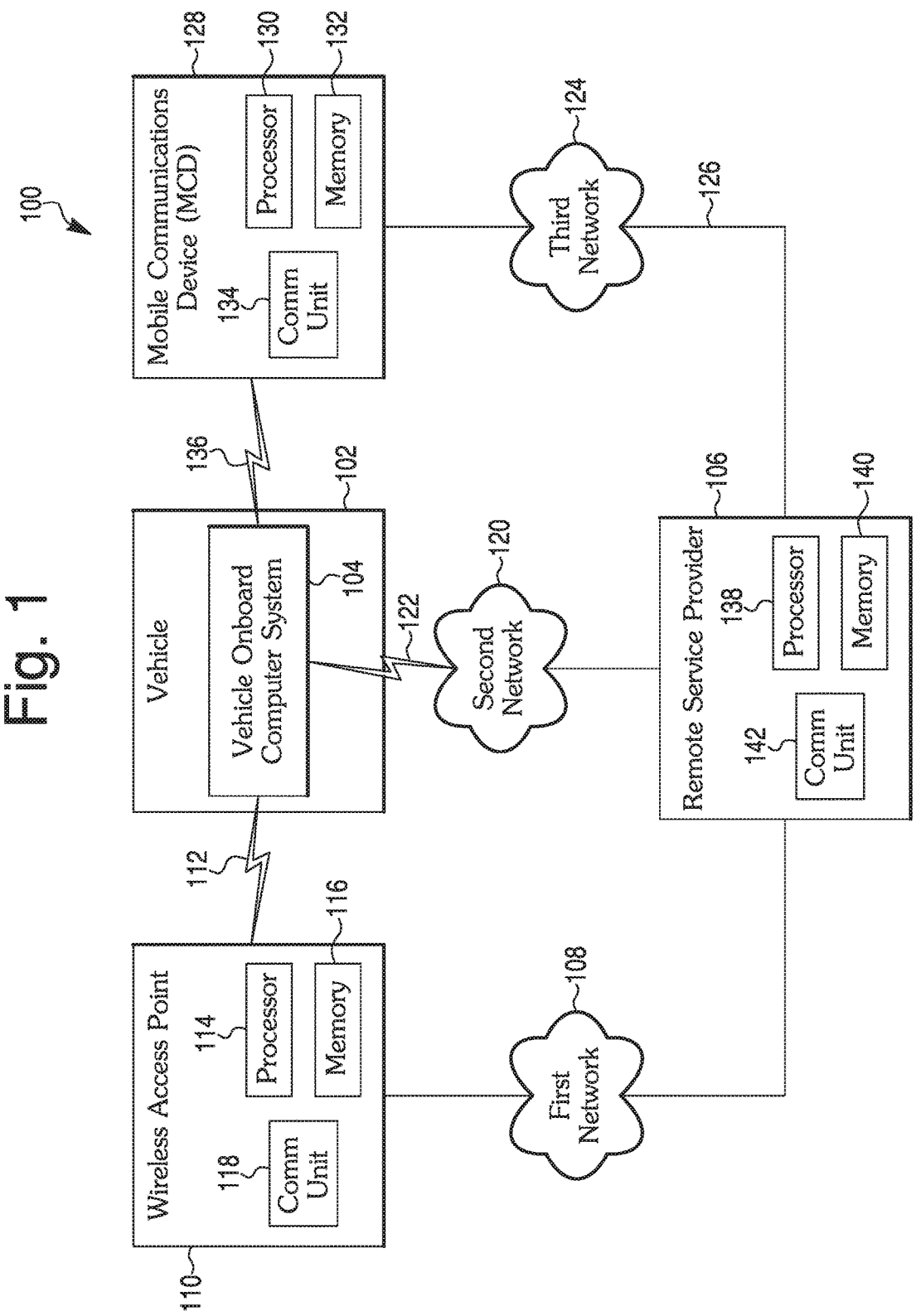
FIG. 1 is a schematic of a network environment in which one embodiment of the disclosed subject matter may operate.

FIG. 1 is a schematic of an exemplary network environment in which one or more of the embodiments for an in-vehicle vehicle controller system may operate. The disclosed network environment 100 is intended to be implemented with any known, related art or later developed technologies. Additionally, the disclosed network environment 100 may be associated with other information, entertainment, mobile, or computer controlled systems for a vehicle, or used in other applications. Other network environments involving vehicles may include different network protocols and/or arrangements as configured for network environment 100 but may be configured to operate similar to, and be compatible with, network environment 100. A vehicle 102 may have one or more in-vehicle computers configured as an onboard computer control system 104 for V2X connected vehicle operations. The network environment 100 may provide one or more network connections between the control system 104 and a remote service provider 106. The remote service provider 106 can include a processor 138 and a memory 140 that can store information accessible by processor 138 including instructions and data that may be executed or otherwise used by the processor 138. The remote service provider 106 may also include a communications unit 142 for communicating with the control system 104. The control system 104 can link to the remote service provider 106 for execution of tasks that can include, but are not limited to, downloading V2X applications, checking for updates to an operating system or V2X applications, and downloading updates to V2X applications and operating system that can be installed and executed in control system 104.

The control system 104 can communicate with the remote service provider 106 via any one or a plurality of a first network 108, a second network 120, and a third network 124. The first network 108, the second network 120, and the third network 124 are merely exemplary, and the environment 100 is intended to include or otherwise cover Wi-Fi networks, cellular telephone networks, satellite networks, a public-switched telephone network (PSTN), a packet-switched network such as the Internet, a local area network (LAN), a wide area network (WAN), a microwave network, and/or other types of networks.

The first network 108 can represent a Wi-Fi network that can be accessed via one or wireless more access points 110. The first network 108 can include devices, processors, and communication connections that utilize 802.x transmission protocols to transmit between endpoints. Although 802.x network protocols are referenced, the first network 108 is intended to include or otherwise cover any Wi-Fi network protocol that can provide wireless connectivity between two endpoints. The first network 108 can include a broadband (Internet) gateway that provides access for end users to the remote service provider 106. Wireless access point 110 can include a processor 114, a memory 116, a communications unit 118 and other components typically present in general or specialized network devices that can store information accessible by processor 114 including instructions and data that may be executed or otherwise used by the processor 114. The communications unit 118 can communicate with a communication system 204 (see FIG. 2) for the control system 104.

The network environment 100 may also include the second network 120 that can provide a communication link between the control system 104 and the remote service provider 106. The second network 120 can include a cellular service network communication link 122 that can include multiple base stations, controllers, and a core network that typically includes multiple switching entities and broadband gateways to the Internet or another broadband network. The control system 104 can access the second network 120 from any location where a cellular service network signal exists that is a compatible with the communication system 204 (see FIG. 2) for control system 104.

The network environment 100 may also include a third network 124 that can provide communication between control system 104 and remote service provider 106, via a short-range communication link 136 between the control system 104 and a mobile communications device (MCD) 128. MCD 128 can include a processor 130 and a memory 132 that can store information accessible by processor 130 including instructions and data that may be executed or otherwise used by the processor 130. MCD also includes a communications unit 134 that can communicate wirelessly with a short-range wireless network 136 the third network 124. Examples of an MCD 128 include portable consumer devices that are capable of transmission from inside or outside vehicle 104 that include, but are not limited to, a cellular phone, a cellular modem, a personal assistance device, a smart phone, a pocket personal computer, a laptop computer, a tablet computer, a smart watch, or other network-capable consumer devices. In alternate embodiments, an MCD 128 can be a device wirelessly connected or wired to another communication device embedded in the vehicle 102, such as a vehicle embedded phone, a wireless network card, or other device that can complete the functions of MCD 128. The embodiments for third network 124 are intended to include or otherwise cover a short-range network connection 112 between control system 104 and MCD 128 such as but not limited to Bluetooth®, Wi-Fi, tethered USB connection, or any known or presently unknown short-range network communication protocol. The third network 124 can use the MCD 128 to connect wirelessly over the MCD cellular service communication link 126, which in turn can connect to the Internet or other broadband network to complete a link to remote service provider 106. As such, MCD cellular service communication link 126 can include multiple base stations, controllers, and a core network that typically includes multiple switching entities and gateways to the Internet, for example.

II. In-Vehicle Controller System

Figure 2:
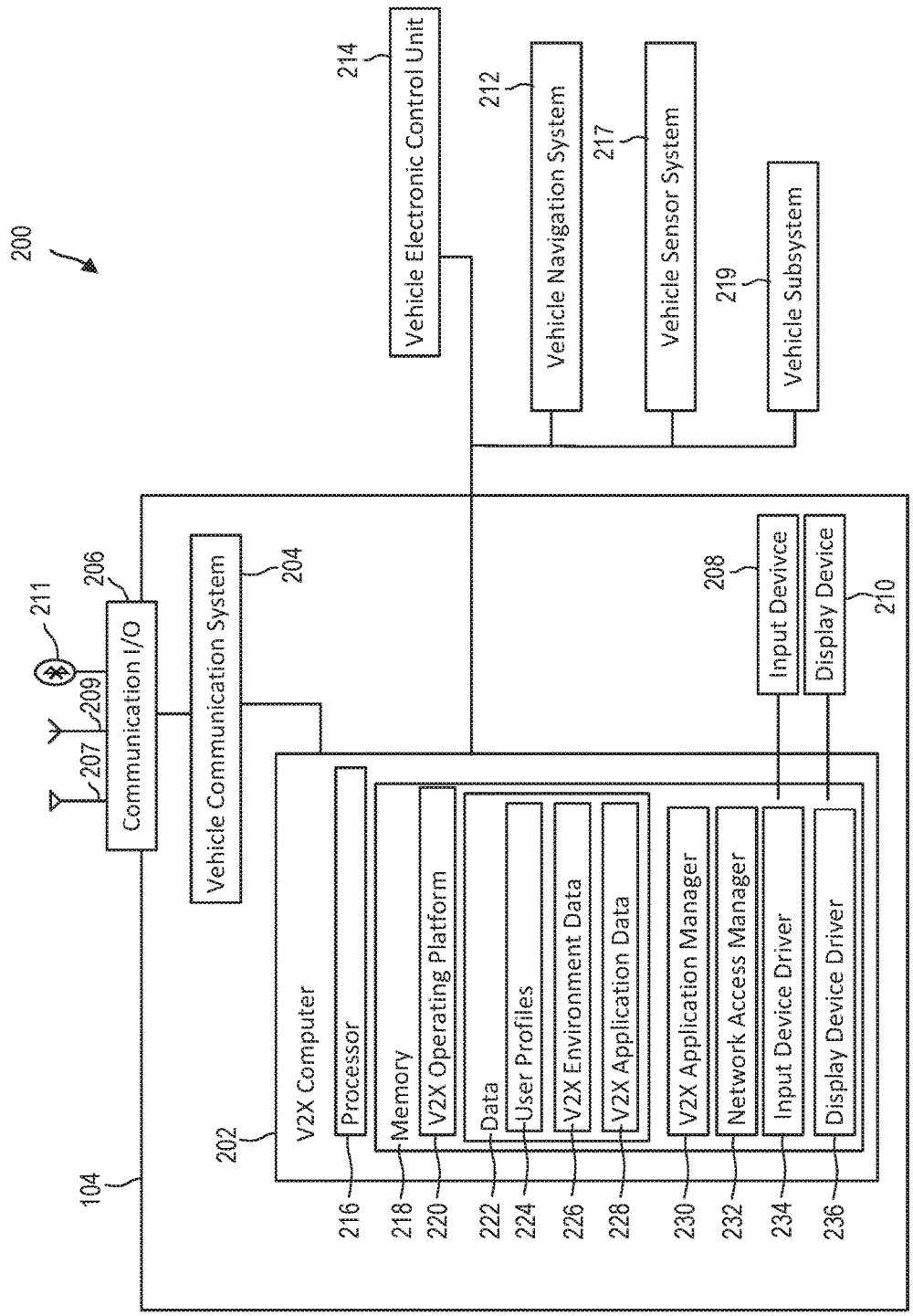
FIG. 2. is a schematic of an in-vehicle controller system according to the disclosed subject matter.

The vehicle 102 may have one or more in-vehicle controller systems configured as the in-vehicle control system 104. FIG. 2 is a schematic 200 of devices and systems of the embodiments that include in-vehicle V2X computer 202. The control system 104 may optionally include a communication system 204 connected to communication input/output 206, input device 208, and display device 210. The communication system 204, communication input/output devices 206, input device 208, and display device 206 may otherwise be separate systems and devices from, but operationally connected to, control system 104.

V2X computer 202 can include a processor 216, a memory 218 and other components typically present in general or special purpose computers. In some embodiments, the onboard V2X computer 202 may include programmable logic circuits and/or pre-configured logic circuits for executing control system 104 functions. The memory 218 stores information accessible by the processor 216 including a V2X operating platform 220 and data 222 that may include instructions that may be executed or otherwise used by the processor 216. The control logic (in this example, software instructions or computer program code), when executed by the processor 216, causes processor 216 to perform the functions of the embodiments as described herein. The memory 218 may be of any type capable of storing information accessible by the processor, including a computer-readable medium, or other medium that stores data that may be read with the aid of an electronic device, such as a hard-drive, flash drive, memory card, ROM, RAM, DVD or other optical disks, as well as other write-capable and read-only memories. Systems and methods may include different combinations of the foregoing, whereby different portions of the V2X operating platform 220 and data 222 are stored on different types of media.

The V2X operating platform 220 may be any set of instructions to be executed directly (such as machine code) or indirectly (such as scripts) by the processor 216. For example, the V2X operating platform 220 may be stored as computer code on the computer-readable medium. In this regard, the terms "instructions" and "programs" may be used interchangeably herein. The V2X operating platform 220 may be stored in object code format for direct processing by the processor 216, or in any other computer language including scripts or collections of independent source code modules that are interpreted on demand or compiled in advance. Functions, methods and routines of the V2X operating platform 220 are explained in more detail below.

Data 222 may be retrieved, stored or modified by the processor 216 in accordance with the V2X operating platform 220. For instance, although the system is not limited by any particular data structure, the data 222 may be stored in computer registers, in a relational database as a table having a plurality of different fields and records, XML documents, flat files, etc. The data 222 may also be formatted in any computer-readable format. The data 222 may include any information sufficient to identify the relevant information, such as numbers, descriptive text, proprietary codes, references to data stored in other areas of the same memory or different memories (including other network locations) or information that is used by a function to calculate the relevant data.

The processor 216 may be any known, related art or later developed processor. Alternatively, the processor may be a dedicated device, such as an ASIC (application-specific integrated circuit), DSP (digital signal processor), etc. Although FIG. 2 illustrates the processor 216, memory 218, and other elements of control system 104 as being within the same block, it will be understood by those of ordinary skill in the art that the processor 216 and memory 218 may actually include multiple processors and memories that may or may not be stored within the same physical housing. For example, memory 218 may be a hard drive or other storage media located in a housing that is different from that of control system 104. Accordingly, references to a processor or computer will be understood to include references to a collection of processors, computers or memories that may or may not operate in parallel. Rather than using a single processor 216 to perform the steps described herein, some of the components, for example an input device 208 and vehicle communication system 204 that sends data and information to processor 216 may each have their own processor that performs calculations related to the device's or system's specific function.

In an alternative embodiment, the processor 216 may be located remote from the vehicle 102 and communicate with the vehicle wirelessly through a remote communication system. In the disclosed embodiments, some of the processes described herein can be executed on a processor 216 disposed within the vehicle 102, and others by a remote processor that can be accessed over one of the first 108, second 120, or third 124 wireless networks. Other in-vehicle computer systems associated with some vehicles 102 may include different elements and/or arrangements as configured for control system 104, but may be configured to operate similar to, and be compatible with, control system 104.

The onboard V2X computer 202 may include all of the components normally used in connection with a computer, such as a central processing unit (CPU) (e.g. processor 216), the memory 218 (e.g., RAM and internal hard drives) storing data 222 and V2X operating platform 220, a communicator/annunciator such as a display device 210 (e.g., a monitor having a screen, a small LCD touch-screen or any other electrical device that is operable to display and/or audibly playout information) configured by display device driver 236, and the user input device 208 (e.g., a mouse, keyboard, touch screen, camera, scanner, and/or microphone) configured by an input device driver 234. It will be understood that, although various systems and control system 104 are shown within vehicle 102, these elements may be external to vehicle 102 and/or physically separated by large distances.

Data 222 can include but is not limited to data for user profiles 224, V2X environment data 226, and V2X application data 228. The control system 104 can also include components not normally associated with general purpose computers, such as a V2X application manager 230 that can store, track, and control versions and updates for V2X applications, and a network access manager 232 that controls and saves configurations for vehicle communication system 204 to communicate with remote service provider 106.

The control system 104 may be capable of communicating with various components of the vehicle 102. For example, control system 104 may be in operational communication with a vehicle electronic control unit (ECU) 214, which controls vehicle processes and systems relevant to operation of the vehicle 102. The ECU can receive data from vehicle systems including a vehicle sensor system 217 and a vehicle subsystem 219 and transmit the data to the V2X computer 202. Data from vehicle subsystem 219 and the vehicle sensor system 217 includes, but is not limited to, fuel level, speed, a rotational speed of an engine, engine temperature, battery charge level, camera images, radar sensor data, etc. Vehicle navigation images and data may be received by control system 104 from a vehicle navigation system 212 via a direct link or through ECU 214. The vehicle navigation system 212 may include a separate navigation system computer system and display or alternatively may share V2X computer 202 and display device 210 with control system 104.

As indicated above, the control system 104 may also include the vehicle communication system 204. The vehicle communication system 204 may include a communication input/output (I/O) 206 that can be used to control radio transmissions between the vehicle communication system 204 and external receivers for DSRC and/or Internet communications using a cellular communication transceiver 207, a Wi-Fi communication transceiver 209, and a short-range communication transceiver 211 (e.g., a Bluetooth® transceiver). While the communication I/O, vehicle communication system 204, input device 208, and display device 210 are shown as part of the control system 104 in FIG. 2, it is understood these devices may separate from the control system 104.

III. Vehicle Interior

Figure 3:
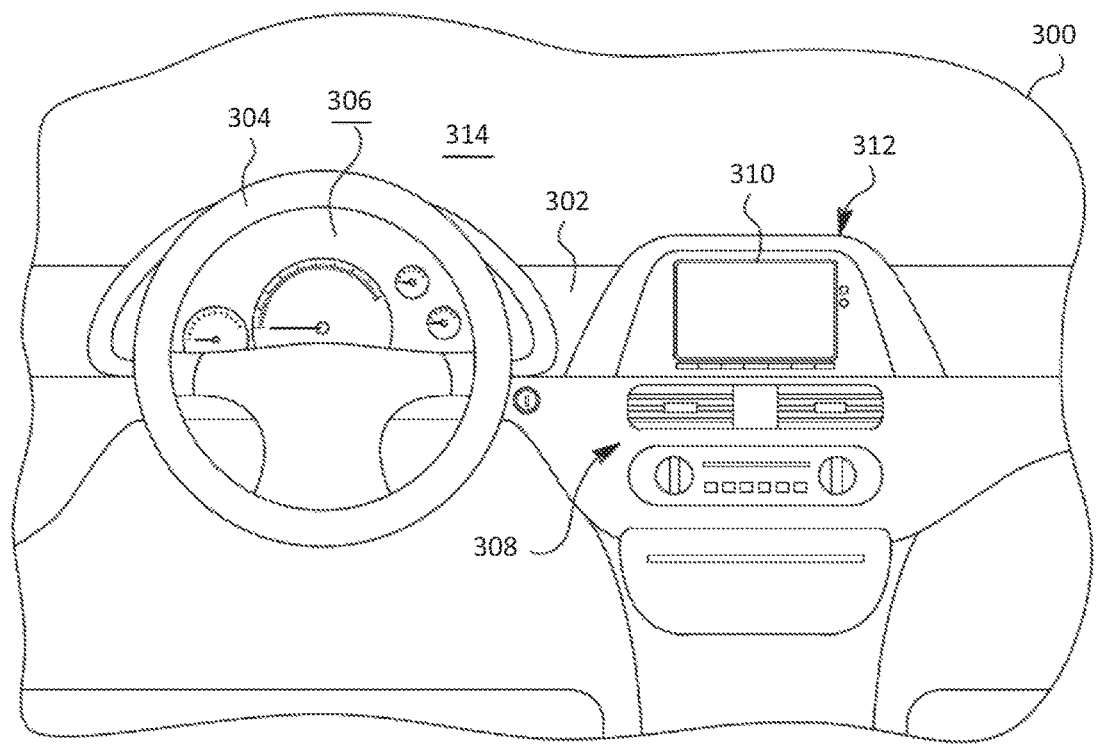
FIG. 3 is a schematic of an exemplary design of a vehicle interior including a display device with which an embodiment may operate.

FIG. 3 is a schematic of an exemplary design of a vehicle interior 300 associated with the vehicle 102 and control system 104 of FIGS. 1 and 2. The vehicle interior 300 may include, for example, a dashboard 302, a steering apparatus such as a steering wheel 304, an instrument panel 306, and a center portion 308. Center portion 308 can include one or more input devices including but not limited to audio devices, video devices, portable consumer device docking stations or USB ports, as well as any other types of input devices. In addition, center portion 308 can be associated with controls for one or more systems of vehicle 102 including, but not limited to: climate control systems, radio and sound systems, and other types of systems. The vehicle interior 300 may also include a display panel 310, that can function as the display device 210, for displaying information from the control system 104, and/or other related or unrelated vehicle systems such as vehicle navigation system 212. Examples of the display panel 310 include, but are not limited to, LCDs, CRTs, ELDs, LEDs, OLEDs, or electronic paper displays. A touchscreen-capable display panel 310 may also function as the input device 208 for activating or deactivating one or more applications of the control system 104 and selecting V2X software application update configurations. The input device 208 can include buttons, a keypad, voice-activated controls received through a microphone or other types of user input technology on and around center dashboard 312. In another embodiment, the display panel 310 can include a heads-up projection type display that is configured to project an image onto one or more surfaces of vehicle interior 300, such as windshield 314. In some embodiments, the display panel 310 can be located in any portion of vehicle interior 300, or can be a portable electronic device that can wirelessly connect to control system 104 via, for example, third network 124. Additionally, display panel 310 can be installed in other areas of interior 300 such as instrument panel 306 or anterior to a passenger seat headrest (not shown).

In addition, while display panel 310 can be configured to present visual information for control system 104, the display panel 310 can be shared with other devices or systems within vehicle 102 such as vehicle navigation system 212, vehicle communication system 204, etc. or a compatible computer system in another vehicle.

IV. Vehicle Communication Network

Figure 4:
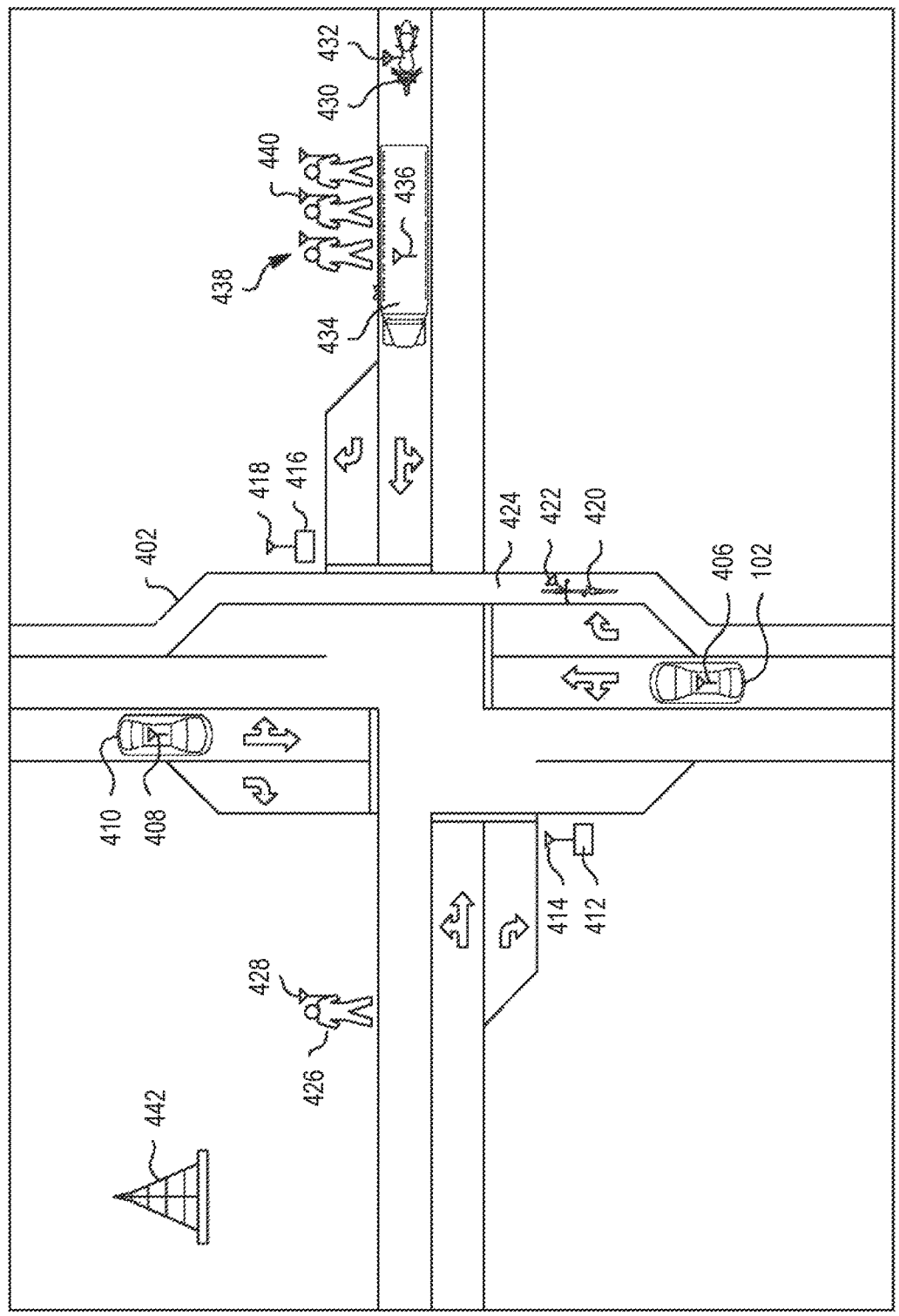
FIG. 4 is a schematic of a traffic scenario that involves V2X connected vehicles at an intersection.

FIG. 4 is a schematic of a traffic scenario that involves an intersection. Some of the disclosed embodiments relate to a vehicle communication network that is disclosed below in the context of a traffic scenario 400. This scenario may involve one or more users and vulnerable road users (VRUs). The users can include vehicles, and the VRUs can include pedestrians, automobiles, trucks, vans, minivans, sport utility vehicles (SUVs), busses, recreational vehicles, amusement park vehicles, trams, golf carts, robotically controlled vehicles, automated drive vehicles, remote controlled vehicles, drones, motorcycles, scooters, mopeds, bicycles, ATVs, roadside units, transportable objects, trains, trams, light rail trains, boats, personal watercraft, aircraft, helicopters, or any transport related entity or infrastructure. In fact, the various disclosed methods and apparatus are intended to be usable with any type of user and/or mode of transport that can travel along, or can be located in proximity to, any improved, unimproved, and/or unmarked path.

The disclosed vehicle communication network is intended to be implemented with any known, related art or later developed technologies. For example, the implemented technologies can involve ad hoc networks, Dedicated Short Range Communications (DSRC) networks (including but not limited to those types of networks currently used by some transport and traffic systems, such as for automatic toll collection), wireless access in vehicular environments (WAVE), cellular networks, Wi-Fi networks, and/or any other network protocol that can provide the desired functionalities.

Some of the embodiments are disclosed below in the context of a DSRC, which is a short to medium range communications service that provides communications links with high data transfer rates with acceptable or minimal latency. Vehicles, users, and infrastructure equipped with DSRC systems may communicate with each other, with remote DSRC compatible transceivers over a network, or with road side equipment (such as transport related infrastructure). The range of DSRC is typically about 300 meters, with some systems having a maximum range of about 1000 meters. DSRC in the United States typically operates in the 5.9 GHz range, from about 5.85 GHz to about 5.925 GHz, and the typical latency for DSRC is about 50 ms. Some DSRC systems communicate with vehicles operating at 100 miles per hour or less, but embodiments are intended to cover communications with vehicles traveling at any speed.

FIG. 4 includes a schematic of the traffic scenario 400 that involves an intersection 402. Various users, entities, and vehicle communication network components can be disposed at or proximate the disclosed intersection 402, including the host vehicle 102, a remote vehicle 410, road side equipment (RSE) 412 and 416, a bicycle 420, a single pedestrian 426, a school bus 434, a group of pedestrians 438, and a motorcycle 430. However, the above users, entities, and components are merely provided for exemplary purposes to facilitate explanation of the disclosed vehicle communication network, and alternative or additional features may be provided. For example, FIG. 4 also shows a bicycle lane 424 along which the bicycle 420 travels. In addition, FIG. 4 shows a cellular network antenna 442 for use with the vehicle communication network.

The host vehicle 102 can transmit, receive and/or exchange communications including data, images, messages, and other information with other vehicles and entities using a DSRC network, which can be implemented with DSRC compatible transceivers, such as V2X compatible transceivers. "V2X" is used in the present disclosure to cover "vehicle-to-everything" communications, and variations of V2X designations may depend on the intended user that is transmitting V2X signals.

As shown in FIG. 4, the host vehicle 102 may be equipped with a vehicle to vehicle (V2V) transceiver 406 that can exchange messages and information with other users equipped with DSRC compatible transceivers. For example, the V2V transceiver 406 can communicate with remote vehicle 410 via a V2V (vehicle to vehicle) transceiver 408, bicycle 420 via a V2B (vehicle to bicycle) transceiver 422, pedestrian 426 via a V2P (vehicle to pedestrian) transceiver 428, motorcycle 430 via a V2M (vehicle to motorcycle) transceiver 432, school bus 434 via a V2V transceiver 436, and pedestrians 438 via V2P transceivers 440. RSEs 412 and 416 are each equipped with V2I transceivers 414 and 418, respectively, which can be used to transmit information from any type of traffic infrastructure, such as traffic signals, or traffic sensors for speed or road conditions, etc.

The V2V transceiver 406 may include components for communicating various types of information between the host vehicle 102 and other network connected vehicles, entities, infrastructure, and networks. In some embodiments, V2V transceiver 406 is intended to be used with one or more vehicle safety systems. Examples of vehicle safety systems include, but are not limited to, collision warning systems, lane departure warning systems, integrated vehicle-based safety systems, automatic guided vehicle systems, other types of safety systems, etc.

In some embodiments, the host vehicle 102 may exchange information between one or more remote vehicles 410. For example, the host vehicle 102 V2V transceiver 406 and remote vehicle 410 V2V transceiver 408 may be configured to exchange vehicle information that can include, but is not limited to, the type of user or vehicle, navigation data, road hazard data, collision warning data, course heading data, course history data, projected course data, kinematic data, current position data, range or distance data, speed and acceleration data, location data, vehicle sensory data, vehicle subsystem data, and/or any other vehicle information. In various embodiments, the host vehicle 102 may exchange information using V2X protocols with any number of vehicles, pedestrians, or any other V2X users with an operational V2X transceiver. For example, the host vehicle 102, remote vehicle 410, motorcycle 430, and school bus 434 may be configured to exchange information over V2X protocols.

Figure 5:
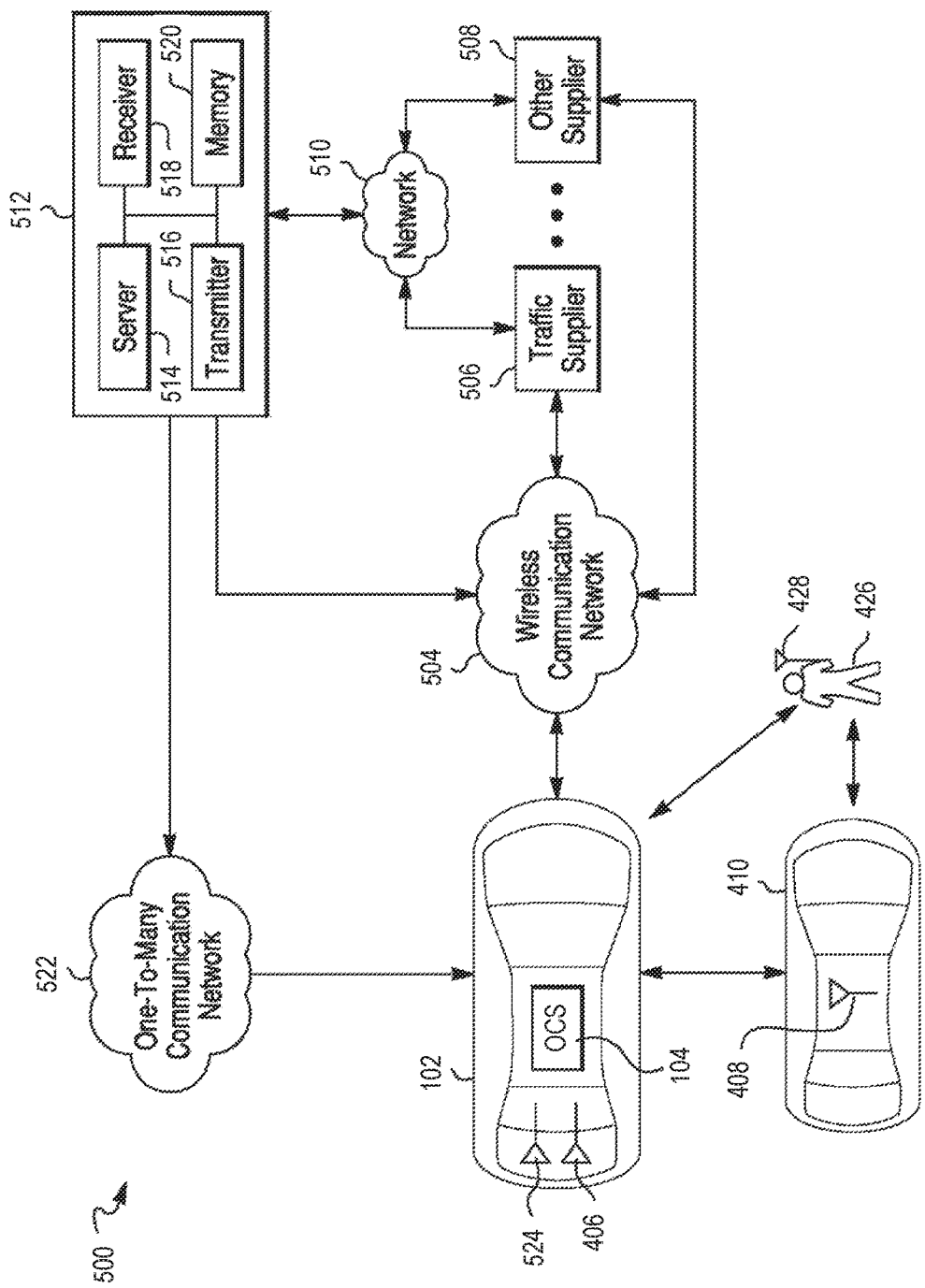
FIG. 5 is a schematic of a vehicle communication network that can be used by V2X connected vehicles according to aspects of the embodiments.

FIG. 5 is a schematic of a vehicle communication network 500 according to some the embodiments. Each V2X compatible entity can exchange messages with any or all other V2X compatible entities. As an example, the host vehicle 102 V2V transceiver 406 may exchange messages with V2V transceiver 408 installed in remote vehicle 410 and/or with V2P transceiver 428 carried by pedestrian 426. V2X messages can describe any collection or packet of information and/or data that can be transmitted over vehicle communication network 500. Messages may take the form of basic safety messages and/or may contain more information than basic safety messages, such as commands that can control another vehicle's automated driving system. V2X messages may include any number of bytes of information or data. Some of the embodiments are intended to include exchanging information and messages between networked vehicles and VRUs that may be useful in facilitating vehicle safety. For example, the information may be useful for a particular vehicle in order to warn a vehicle or broadcast a warning to a group of V2X users. For example, the host vehicle 102 can include a collision warning system that can receive and assess safety information and data.

Components of DSCR communications can exchange safety messages, warnings and alerts, and/or other useful information with V2X users via V2V transceiver 406. The control system 104 ("OCS" in FIG. 5) may transmit and receive information directly or indirectly to and from a service provider 512 over a wireless communication network 504. In one embodiment, the host vehicle 102 is connected with the service provider 512 by way of a one-to-many communication network 522. In an embodiment, the service provider 512 includes a remote server 514, a remote transmitter 516, a remote receiver 518, and a remote memory 520 that are configured to be in communication with one another. The one-to-many communication network 522 can include systems that can send information from one source to a plurality of receivers. Examples of one-to-many communication networks can include television, radio, satellite networks, etc.

In FIG. 5, the V2V transmitter 406 can be used by the control system 104 to receive and transmit information to and from the service provider 512 and other information providers through wireless communication network 504 and broadband network 510, such as the Internet. In alternative embodiments, an RF transceiver 524 can be used by the control system 104 to receive and transmit information to and from the service provider 512 through wireless communication network 504 and broadband network 510, such as the Internet. RF transmitter 524 can include, but is not limited to, a wireless phone, a wireless modem, a Wi-Fi compatible transceiver, and/or any other device that communicates with other networks using a wireless communication network 504. V2V transmitter 406 can also receive and transmit information to and from traffic data supplier 506 and/or other information supplier 508. This information can include, but is not limited to, train schedules, high-traffic event schedules, other transport related data, etc. Traffic data supplier 506 and other information supplier 508 can communicate with service provider 512 through network 510.

In an embodiment, service provider 512 may be linked to other vehicles through a network connection, such as via cellular network antenna 442 (see FIG. 4), and/or other network connection. Further, any other wireless communication system capable of delivering data may be used such as satellite Wi-Fi, WiMAX, microwave, etc. Service provider 512 may also be linked by a wired connection, such as broadband cable or fiber optic connections, Ethernet, DSL, ADSL, telephone modems, and/or any other wired communication system capable of delivering data. Some of the embodiments are intended to include each V2X transceiver configured to communicate with wireless communication network 504 through cellular network antenna 442 or a V2I network connection.

V. Method of Operation

Figure 6:
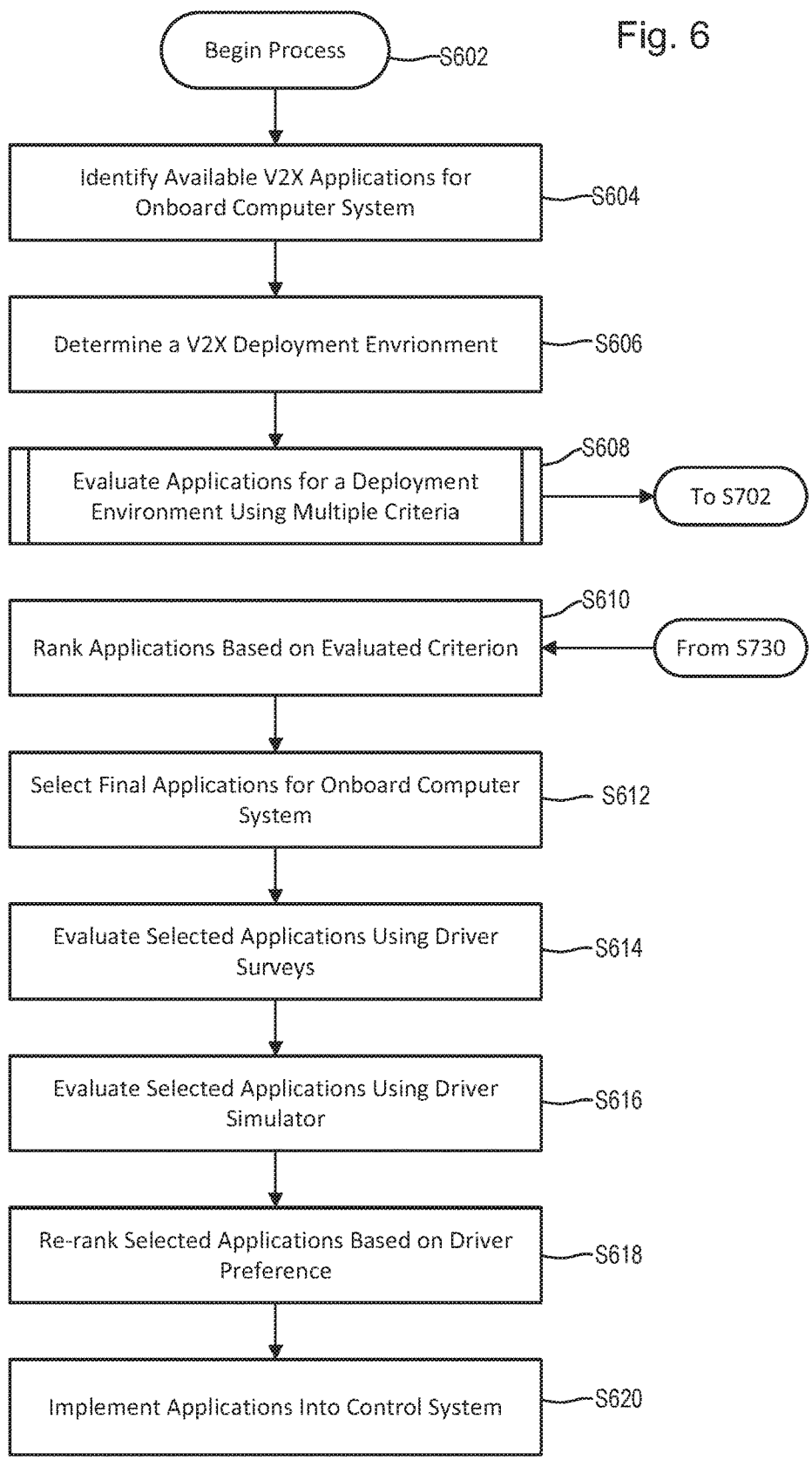
FIG. 6 is a flowchart of an exemplary process or algorithm that a computer system can follow to evaluate and rank V2X applications.

FIG. 6 is a flowchart of an exemplary process or algorithm S600 that a computer system 800 (see FIG. 8) can follow to evaluate and rank V2X applications. The embodiments can provide a process by which a heterogeneous set of V2X applications may be analyzed and ranked for various parameters and environments. The computer system 800 can begin the process S600 at step S602. The computer system 800 can then proceed to step S604.

At step S604, the computer system 800 can obtain information about V2X compatible applications for a vehicle and identify available V2X applications for the onboard control system 104. In the embodiments, various V2X applications can be identified from multiple sources. The commonality among the applications is the use of V2X as enabling technology. In other embodiments, other V2X compatible applications can rely on other technologies such as, but not limited to, radar, GPS, etc. that are complimentary to a V2X platform. The computer system can proceed to step S606.

At step S606, the computer system can determine a V2X deployment environment. In the embodiments, the environment can include but is not limited a V2X implementation for a certain group of users, a certain class of vehicles, a certain geographic area, etc. At step S608 the computer system 800 can evaluate V2X applications for a certain deployment environment, determined in step S606, using multiple criteria. The step S608 includes subroutines and proceeds to step S702 and the process described in FIG. 7.

Figure 7:
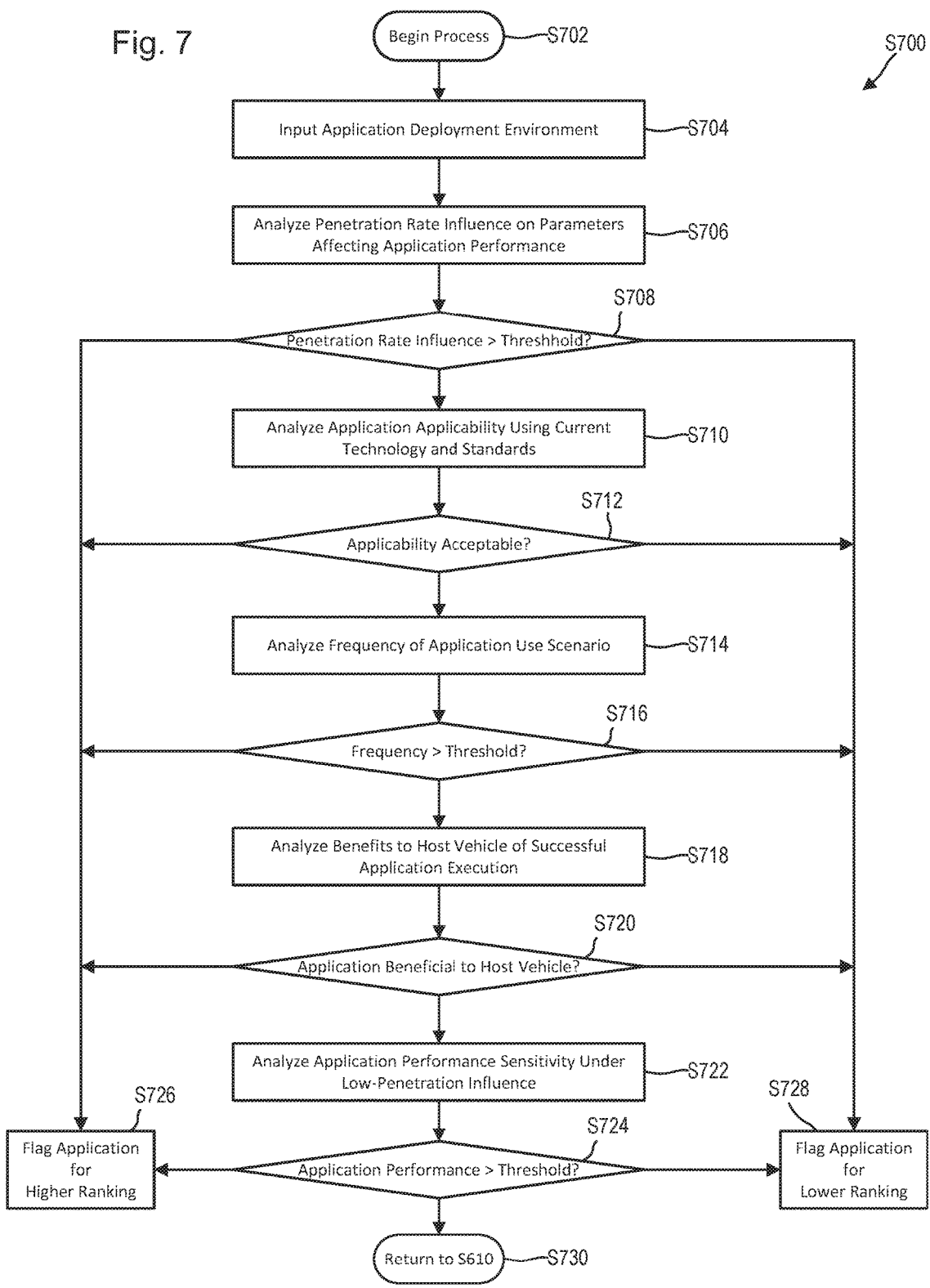
FIG. 7 is a flowchart of a subroutine of the exemplary process of FIG. 6 that a computer system can follow to evaluate V2X applications for a deployment environment using multiple criteria.

FIG. 7 is a flowchart of an exemplary subroutine of the process of FIG. 6 that computer system 800 can follow to evaluate V2X applications for a deployment environment using multiple criteria. The exemplary process describes processing five different criteria in order to rank an effectiveness of a V2X application. However, a ranking of an application can be performed with fewer than five criteria, or alternatively, more than five criteria. The computer system 800 can begin the process S700 at step S702. The computer system 800 can then proceed to step S704. At step S704, the computer system 800 can input factors from the application deployment environment determined in step S606 as the environment with which to analyze each application criteria. In step S706, the computer system can analyze a market penetration rate influence on parameters affecting an application performance. At step S708, if the market penetration rate influence is greater than a predetermined threshold, then the application can be flagged by the computer system 800 at step S726 for a higher ranking among the group of applications. Otherwise, the computer system 800 can flag the application for a lower ranking at step S728.

The computer system can proceed to step S710 to analyze an application applicability using current technology and standards. In step S712, if the applicability is acceptable according to current technology and standards, then then the application can be flagged by the computer system 800 at step S726 for a higher ranking among the group of applications. Otherwise, the computer system 800 can flag the application for a lower ranking at step S728. At step S714, the computer system 800 can analyze a frequency of application use scenario. In this step, the computer system 800 can evaluate a frequency at which a traffic or environment scenario may occur that the application can address using V2X-related technology. At step S716, if the frequency of a scenario occurs more than a threshold amount, then the application can be flagged by the computer system 800 at step S726 for a higher ranking among the group of applications. Otherwise, the computer system 800 can flag the application for a lower ranking at step S728.

Proceeding to step S718, the computer system 800 can analyze benefits to the host vehicle 102 resulting from successful execution of the application. The analysis can be performed cumulatively or per occurrence of each successful execution. At step S720, if the benefit is greater than a predetermined threshold then then the application can be flagged by the computer system 800 at step S726 for a higher ranking among the group of applications. Otherwise, the computer system 800 can flag the application for a lower ranking at step S728.

At step S722, the computer system 800 can analyze application performance sensitivity under low market penetration influence. At step S724, if the application performance is greater than a predetermined threshold, then then the application can be flagged by the computer system 800 at step S726 for a higher ranking among the group of applications. Otherwise, the computer system 800 can flag the application for a lower ranking at step S728. At step S730, the process can return to step S610 in FIG. 6.

At step S610 the computer system 800 can rank applications on the criteria representative of a deployment environment that have been tagged with ranking flags from the process in FIG. 7. At step S612, the computer system 800 can select one or more final V2X applications according to the rankings to implement in the onboard control system 104. The ranked V2X applications can be further evaluated for various factors and driver preferences. At step S614, the computer system 800 can further evaluate and flag the selected applications for higher or lower rankings based on feedback from driver surveys containing driver feedback regarding the applications. At step S616, the computer system 800 can further evaluate and flag the selected applications for higher or lower rankings based on driver simulations using the applications. At step S618, the computer system 800 can refine the application rankings and re-rank each application if the evaluations from steps S614 and S616 indicate data above a threshold that could trigger a higher or alternatively a lower ranking of the application by the computer system 800.

A process for ranking certain V2X applications of the embodiments can end at step S618. However, in some embodiments, an implementer may desire to install one or more ranked V2X applications in the V2X computer system 102 of vehicle 104.

VI. Computer System

Figure 8:
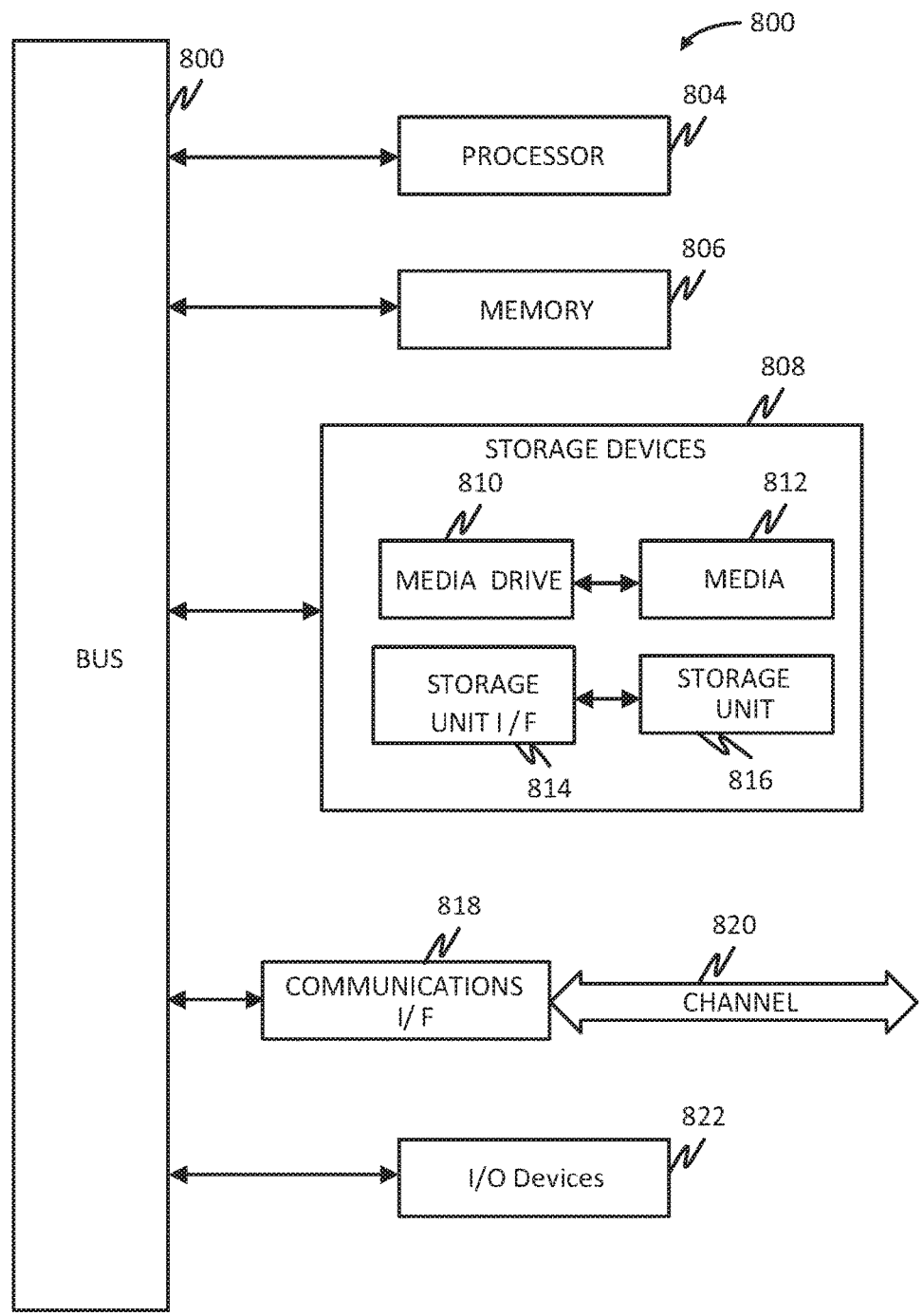
FIG. 8 is a schematic of computer system in which the embodiments can be implemented.

FIG. 8 is a schematic of computer system in which the embodiments can be implemented. As will be also appreciated, the above-described techniques may take the form of computer or controller implemented processes and apparatuses for practicing those methods. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

FIG. 8 illustrates an exemplary computer system in which the processors, computers, and servers in which FIGS. 1-7 may be employed to implement processing functionality for various embodiments of the invention. Those skilled in the relevant art will also recognize how to implement the invention using other computer systems or architectures. Computer system 800 may represent, for example, a personal computer device, a controller, a server, a computer system, or any other type of special or general purpose computer device as may be desirable or appropriate for the apparatus, systems, and methods of the embodiments.

Computer system 800 can include one or more processors, such as a processor 804. Processor 804 can be implemented using a general or special purpose processing engine such as, for example, a microprocessor, microcontroller or other control logic. In this example, processor 804 is connected to a data pathway or bus 802 (e.g., buses, Ethernet) or other communication medium. Although only one processor 804 is shown, in certain embodiments, the computer system may include more processors in an expanded or distributed design.

Computer system 800 can also include a main memory 806, preferably random access memory (RAM) or other dynamic memory, for storing information and instructions to be executed by processor 804. The processor 804 accepts instructions and data from the memory 806 and performs various data processing functions of the system. These data processing functions may include, but are not limited to, providing graphical format objects via a graphical user interface, creating a graphical representation for a plurality of attributes, defining values of attributes based on selection of the graphical representation, executing operation on the computer system based on graphical representation and values of attributes, and so forth. The processor 804 includes an arithmetic logic unit (ALU) that performs arithmetic and logical operations, and a control unit that extracts instructions from memory 806 and decodes and executes them, calling on the ALU when necessary. Main memory 806 also may be used for storing temporary variables or other intermediate information during execution of instructions to be executed by processor 804. The memory 806 stores a variety of data received by the computer system 800 and computed by the various data processing functions of the computer system 800.

Computer system 800 may likewise include a read only memory ("ROM") or other static storage device coupled to the data pathway 802 for storing static information and instructions for processor 804. Also, the memory 806 preferably contains an operating system, which executes on the processor 804. The operating system performs basic tasks that include recognizing input, sending output to output devices, keeping track of files and directories and controlling various peripheral devices.

Computer system 800 may also include information storage devices 808, which may include, for example, a media drive 810 and a removable storage interface 814. The media drive 810 may include a drive or other mechanism to support fixed or removable storage media 812, such as a hard disk drive, a floppy disk drive, a magnetic tape drive, an optical disk drive, a CD or DVD drive (R or RW), or other removable or fixed media drive. A storage media drive 812 may include, for example, a hard disk, floppy disk, magnetic tape, optical disk, CD or DVD, or other fixed or removable medium that is read by and written to by media drive 810. As these examples illustrate, storage media 812 may include a computer-readable storage medium having stored therein particular computer software or data with non-transitory signals.

Computer system 800 can also include a communications interface 818 that enables the computer system 800 to access other computers and resources on a communication network. Communications interface 818 can be used to allow software and data to be transferred between computer system 800 and external devices. Examples of communications interface 818 can include a modem, a network interface (such as an Ethernet or other NIC card), a communications port (such as for example, a USB port), a PCMCIA slot and card, etc. Software and data transferred via communications interface 818 are in the form of signals which can be electronic, electromagnetic, optical, or other signals capable of being received by communications interface 818. These signals are provided to communications interface 818 via a channel 820. This channel 820 may carry signals and may be implemented using a wireless medium, wire or cable, fiber optics, or other communications medium. Some examples of a channel include a phone line, a cellular phone link, an RF link, a network interface, a local or wide area network, and other communications channels. What is important is that the various computers and peripherals can interact to perform various document services.

Computer system 800 further includes input/output devices 822 such as a keyboard and a mouse that enables a user to enter data and instructions into the computer system 800, a display device that enables the user to view the available information, and a printer that enables the user to print any data for his reference. Alternatively, input/output devices 822 may include a touch sensitive display that enables a user to enter data and instructions into the computer system 800 as well as to view the available information In this document, the terms "computer program product" and "computer-readable medium" may be used generally to refer to media such as, for example, memory 806, storage devices 808, storage unit 816, or signal(s) on channel 820. These and other forms of computer-readable media may be involved in providing one or more sequences of one or more instructions to processor 804 for execution. Such instructions, generally referred to as "computer program code" (which may be grouped in the form of computer programs or other groupings), when executed, enable computer system 800 to perform features or functions of embodiments of the present invention.

In an embodiment where the elements are implemented using software, the software may be stored in a computer-readable medium and loaded into computer system 800 using, for example, removable storage unit 816, media drive 810 or communications interface 818. The control logic (in this example, software instructions or computer program code), when executed by processor 804, causes processor 804 to perform the functions of the invention as described herein.

The above described techniques may take the form of computer or controller implemented processes and apparatuses for practicing those methods. The disclosure can also be embodied in the form of computer program code containing instructions 220 embodied in tangible media, such as floppy diskettes, CD-ROMs, hard drives, or any other computer-readable storage medium, wherein, when the computer program code is loaded into and executed by a computer or controller, the computer becomes an apparatus for practicing the embodiments. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the embodiments. When implemented on a general-purpose microprocessor, the computer program code segments configure the microprocessor to create specific logic circuits.

VII. Alternative Embodiments

While certain embodiments of the invention are described above, and FIGS. 1-8 disclose the best mode for practicing the various inventive aspects, it should be understood that the invention can be embodied and configured in many different ways without departing from the spirit and scope of the invention.

Exemplary embodiments are intended to include or otherwise cover additional criteria to configure and use one or more networks shown in FIG. 1. Additional criteria may include tracking a vehicle's movement as it passes through different network coverage areas and tracking the strength and type of network signals received along various paths of the host vehicle 102. Network data collected along a path of the vehicle 102 can include network protocols for a type of network, sub-network protocols within the network, e.g., 4G network, 3G network, GSM network, Wi-Fi networks, and bandwidth or download speeds of each network and sub-network along the path of the vehicle.

Exemplary embodiments are intended to include or otherwise cover any type of application for use by a vehicle's V2X computer system according to one or more user defined or automatically determined criteria. In other words, exemplary embodiments are intended to cover any application of a process of determining a wireless network out of two or more networks that is the most likely network to successfully complete a download of an operating system or application file to in-vehicle computer 202 under predetermined criteria.

Some of the exemplary embodiments are disclosed in the context of in-vehicle vehicle computer systems for infotainment systems. However, any and all of the disclosed features can also be applied to other types of in-vehicle vehicle computer systems, such as manually operated vehicles. In fact, some embodiments can be applied in contexts that do not involve vehicles.

Exemplary embodiments are intended to include or otherwise cover any type of a software-driven entertainment or information system for vehicle 102 according to the embodiments that can be configured outside of the vehicle 102 and that can communicate instructions 220 and commands for execution of system operations. An example of an infotainment system that can be configured outside of the vehicle 102 is an infotainment system that is manufactured, tested, and configured as an individual unit, and the unit later installed within vehicle 102.

In other words, the various embodiments are not limited to vehicle infotainment systems, and can alternatively or additionally be applied to other vehicle systems that include software and/or firmware. For example, the various embodiments can be applied to over the air firmware updates as well as software updates, and vehicle systems other than infotainment systems (such as vehicle ECUs) can be updated.

Exemplary embodiments are intended to cover execution of method steps on any appropriate specialized or general purpose server, computer device, or processor in any order relative to one another. Some of the steps in the embodiments can be omitted, as desired, and executed in any order.

A computer architecture of the embodiments may be a general purpose computer and/or processor or a special purpose computer and/or processor. A computer and/or processor can be used to implement any components of the control system 104 or the computer-implemented methods of the embodiments. For example, components of control system 104 can be implemented on a computer via its hardware, software program, firmware, or a combination thereof. Although individual computers or servers are shown in the embodiments, the computer functions relating to control system 104 may be implemented in a distributed fashion on a number of similar platforms, to distribute the processing and/or functional load.

Embodiments are also intended to include or otherwise cover methods of using and methods of manufacturing the control system 104 disclosed above. The methods of manufacturing include or otherwise cover processors and computer programs implemented by processors used to design various elements of the control system 104 above. For example, embodiments are intended to cover processors and computer programs used to design or test the control system 104.

Exemplary embodiments are intended to cover all software or computer programs capable of enabling processors to execute instructions and implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Embodiments are amenable to a variety of modifications and/or enhancements. For example, although the implementation of various components described above may be embodied in a hardware device, it can also be implemented as a software-only solution, e.g., an installation on an existing server. In addition, systems and their components as disclosed herein can be implemented as a firmware, firmware/software combination, firmware/hardware combination, or a hardware/firmware/software combination.

Some of the disclosed embodiments include or otherwise involve data transfer over a network, such as downloading update files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), Wi-Fi networks, a Dedicated Short Range Communications (DSRC), network, short-wave radio, television, cable, satellite communications, and/or any other delivery or tunneling mechanism for carrying data. A network may include multiple networks or sub-networks, each of which may include, for example, a wired or wireless data pathway. The network may include a circuit-switched network, a packet-switched network, or any other network able to carry electronic communications. For example, the network may include networks based on the Internet protocol (IP) or asynchronous transfer mode (ATM). Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention.

What is claimed is:

1. A method of configuring a processor based computer system for enabling an implementer to select software for deployment in a vehicle control system, the method comprising:

configuring the processor based computer system via a user interface so as to perform a first identifying step that includes identifying available vehicle-to-everything (V2X) applications for the system, a second evaluation step that includes evaluating parameters for the V2X applications identified in the first identifying step, and a third ranking step that includes raising or lowering the ranking of each V2X application based on the second evaluation step, wherein the second evaluation step includes, for each of the V2X applications, the steps of:

analyzing a market penetration rate influence on parameters affect the V2X application performance, analyzing the V2X application's applicability to current technology and technological standards, analyzing a frequency at which a roadway scenario occurs that could be addressed by the V2X application, analyzing one or more benefits to a host vehicle hosting the control system resulting from a successful execution of the V2X application, analyzing application performance sensitivity under a low market penetration influence, and analyzing one or more driver preferences of each of the V2X applications.

2. A processor based computer system for enabling an implementer to select software for deployment in a vehicle control system, the processor based computer system comprising:
- a memory storing software instructions;
- a hardware processor that is configured to execute the software instructions to perform a first identifying step that includes identifying available vehicle-to-everything (V2X) applications for the system, a second evaluation step that includes evaluating parameters for the V2X applications identified in the first identifying step, and a third ranking step that includes raising or lowering the ranking of each V2X application based on the second evaluation step, wherein second evaluation step includes, for each of the V2X applications, the steps of:
- analyzing a market penetration rate influence on parameters affect the V2X application performance,
- analyzing the V2X application's applicability to current technology and technological standards,
- analyzing a frequency at which a roadway scenario occurs that could be addressed by the V2X application,
- analyzing one or more benefits to a host vehicle hosting the control system resulting from a successful execution of the V2X application,
- analyzing application performance sensitivity under a low market penetration influence, and
- analyzing one or more driver preferences of each of the V2X applications.

3. The processor based computer system of claim 2, further comprising a fourth driver evaluation step that includes evaluating the ranked V2X applications using driver surveys, and re-ranking the ranked V2X applications based on the driver surveys.

4. The processor based control system of claim 3, further comprising a receiving step that includes the processor configuring a user interface for the computer system to enable a driver to enter data in response to one or more of the driver surveys.

5. The processor based computer system of claim 2, further comprising a fifth driver simulation step that includes evaluating the ranked V2X applications using a driver simulator, and re-ranking the ranked V2X applications based on results from the driver simulator.

6. The processor based computer system of claim 2, further including, prior to the second evaluating step, a determining step that includes determining one or more intended deployment environments for implementation of the V2X applications.

7. The processor based computer system of claim 6, wherein the second evaluating step includes evaluating the V2X applications for the one or more determined deployment environments.

8. The processor based computer system of claim 7, wherein the third ranking step further includes ranking each criterion of each V2X application against the corresponding criteria from all V2X applications as evaluated in corresponding intended deployment environments.

9. The processor based control system of claim 8, wherein the third ranking step further includes creating categories of ranked V2X applications, each category corresponding to different intended deployment environments and intended groups of users for the different intended deployment environments.

10. The processor based control system of claim 8, wherein the second step of analyzing a frequency further includes collecting one or more of traffic data, navigation data, and V2X data from each of the intended deployment environments, and analyzing a frequency at which a roadway scenario occurs within each of the intended deployment environments.

11. The processor based computer system of claim 2, wherein each of the V2X applications use V2X-compatible technology as an enabling technology for the applications.

12. A system for enabling an implementer to select software for deployment in a vehicle control system, the system comprising:
- a memory storing software instructions;
- a hardware processor that is configured to execute the software instruction to perform a first identifying step that includes identifying available vehicle-to-everything (V2X) applications for the vehicle control system, a second evaluation step that includes evaluating parameters for the V2X applications identified in the first identifying step, and a third ranking step that includes raising or lowering the ranking of each V2X application based on the second evaluation step, wherein the processor based control system is configured so that the second evaluation step includes, for each of the V2X applications, the steps of:
- analyzing a market penetration rate influence on parameters affect the V2X application performance,
- analyzing the V2X application's applicability to current technology and technological standards,
- analyzing a frequency at which a roadway scenario occurs that could be addressed by the V2X application,
- analyzing one or more benefits to a host vehicle hosting the control system resulting from a successful execution of the V2X application,
- analyzing application performance sensitivity under a low market penetration influence, and
- analyzing one or more driver preferences of each of the V2X applications; and
- a vehicle control system that is configured for operation with a host vehicle, wherein certain of the ranked V2X applications can be executed by a processor in the vehicle control system.

13. The system of claim 12, further comprising a fourth driver evaluation step that includes evaluating the ranked V2X applications using driver surveys, and re-ranking the ranked V2X applications based the driver surveys.

14. The system of claim 13, further comprising a receiving step that includes the processor configuring a user interface for the computer system to enable a driver to enter data in response to one or more of the driver surveys.

15. The system of claim 12, further comprising a fifth driver simulation step that includes evaluating the ranked V2X applications using a driver simulator, and re-ranking the ranked V2X applications based on results from the driver simulator.

16. The system of claim 12, further including, prior to the second evaluating step, a determining step that includes determining one or more intended deployment environments for implementation of the V2X applications.

17. The system of claim 16, wherein the second evaluating step includes evaluating the V2X applications for the one or more determined deployment environments.

18. The system of claim 17, wherein the third ranking step further includes ranking each criterion of each V2X application against the corresponding criteria from all V2X applications as evaluated in corresponding intended deployment environments.

19. The system of claim 18, wherein the third ranking step further includes creating categories of ranked V2X applications, each category corresponding to different intended deployment environments and intended groups of users for the different intended deployment environments, and wherein the second step of analyzing a frequency further includes collecting one or more of traffic data, navigation data, and V2X data from each of the intended deployment environments, and analyzing a frequency at which a roadway scenario occurs within each of the intended deployment environments.

20. The system of claim 12, wherein each of the V2X applications use V2X-compatible technology as an enabling technology for the applications.

\* \* \* \* \*